(12) United States Patent
Hardy et al.

(10) Patent No.: US 9,621,960 B2
(45) Date of Patent: Apr. 11, 2017

(54) MAJORITY RULE SELECTION OF MEDIA CONTENT

(71) Applicant: Echostar Technologies, LLC, Englewood, CO (US)

(72) Inventors: Chris Hardy, Cheyenne, WY (US); Allan Yarborough, Cheyenne, WY (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 493 days.

(21) Appl. No.: 13/801,932

(22) Filed: Mar. 13, 2013

(65) Prior Publication Data

US 2014/0282744 A1 Sep. 18, 2014

(51) Int. Cl.
| | |
|---|---|
| H04N 7/173 | (2011.01) |
| H04N 5/445 | (2011.01) |
| H04N 21/482 | (2011.01) |
| H04N 21/442 | (2011.01) |
| H04N 21/466 | (2011.01) |

(52) U.S. Cl.
CPC ..... *H04N 21/482* (2013.01); *H04N 21/44222* (2013.01); *H04N 21/4667* (2013.01)

(58) Field of Classification Search
CPC .................................................. H04N 21/4758
USPC ....................................................... 725/24, 61
See application file for complete search history.

(56) References Cited

U.S. PATENT DOCUMENTS

| | | |
|---|---|---|
| 9,288,551 B2 | 3/2016 | Kummer |
| 2003/0154475 A1 | 8/2003 | Rodriguez et al. |
| 2003/0172376 A1 | 9/2003 | Coffin, III |
| 2005/0091690 A1 | 4/2005 | Delpuch et al. |
| 2007/0169165 A1* | 7/2007 | Crull .................. G06F 17/3089 725/135 |
| 2007/0288951 A1 | 12/2007 | Ray et al. |
| 2008/0244666 A1 | 10/2008 | Moon et al. |

(Continued)

FOREIGN PATENT DOCUMENTS

| | | |
|---|---|---|
| WO | 2011040999 A1 | 4/2011 |
| WO | 2014/072742 A1 | 5/2014 |
| WO | 2014/164782 A1 | 10/2014 |

OTHER PUBLICATIONS

International Search Report and Written Opinion for PCT/US2014/023466 mailed Jul. 10, 2014, 15 pages.

(Continued)

*Primary Examiner* — Gigi L Dubasky
(74) *Attorney, Agent, or Firm* — Kilpatrick Townsend & Stockton LLP

(57) ABSTRACT

A mobile device may be registered to participate in selection of television programming for presentation by a display device external the mobile device. An indication of selection of particular television programming for presentation by a display device may be received from the mobile device. A determination may be made, based on the indication of selection, whether a collective indication of selection tally of the particular television programming is greater than a collective indication of selection tally of other television programming. The particular television programming may be output for presentation by the display device when the particular television programming has a collective indication of selection tally greater than a collective indication of selection tally of other television programming.

18 Claims, 7 Drawing Sheets

(56) References Cited

U.S. PATENT DOCUMENTS

| | | |
|---|---|---|
| 2008/0270038 A1 | 10/2008 | Partovi et al. |
| 2009/0210898 A1* | 8/2009 | Childress ............... H04H 60/46 |
| | | 725/34 |
| 2009/0228911 A1 | 9/2009 | Vrijsen |
| 2010/0064306 A1* | 3/2010 | Tiongson ......... H04N 21/25891 |
| | | 725/24 |
| 2010/0071007 A1 | 3/2010 | Meijer |
| 2010/0125864 A1* | 5/2010 | Dwyer et al. ................... 725/24 |
| 2010/0146560 A1 | 6/2010 | Bonfrer |
| 2010/0218214 A1 | 8/2010 | Fan et al. |
| 2011/0082858 A1 | 4/2011 | Yu et al. |
| 2011/0173337 A1* | 7/2011 | Walsh et al. .................. 709/229 |
| 2012/0110615 A1 | 5/2012 | Kilar et al. |
| 2012/0110616 A1 | 5/2012 | Kilar et al. |
| 2012/0124625 A1 | 5/2012 | Foote et al. |
| 2012/0260295 A1* | 10/2012 | Rondeau .......... H04N 21/41407 |
| | | 725/62 |
| 2012/0278834 A1 | 11/2012 | Richardson |
| 2012/0284745 A1 | 11/2012 | Strong |
| 2013/0291037 A1 | 10/2013 | Im et al. |
| 2014/0068692 A1 | 3/2014 | Archibong et al. |
| 2014/0114966 A1 | 4/2014 | Bilinski et al. |
| 2014/0150009 A1 | 5/2014 | Sharma |
| 2014/0282779 A1 | 9/2014 | Navarro |

OTHER PUBLICATIONS

U.S. Appl. No. 13/834,916, filed Mar. 15, 2013 Non Final Office Action dated Aug. 8, 2014, 19 pages.
U.S. Appl. No. 13/834,916, filed Mar. 15, 2013 Final Office Action mailed Jan. 12, 2015, 22 pages.
U.S. Appl. No. 13/834,916, filed Mar. 15, 2013 Non Final Office Action mailed Apr. 27, 2015, 22 pages.
International Preliminary Report on Patentability for PCT/US2014/023466 issued Sep. 15, 2015, 8 pages.
U.S. Appl. No. 13/834,916, filed Mar. 15, 2013 Final Office Action mailed Dec. 14, 2015, 31 pages.
U.S. Appl. No. 14/297,322, filed Jun. 5, 2014 Notice of Allowance mailed Nov. 5, 2015, 34 pages.
U.S. Appl. No. 14/297,279, filed Jun. 5, 2014 Non-Final Office Action mailed Nov. 5, 2015, 45 pages.
International Search Report and Written Opinion for PCT/GB2015/052570 mailed Dec. 11, 2015, all pages.
U.S. Appl. No. 14/297,279, filed Jun. 5, 2014 Final Rejection mailed Apr. 22, 2016, 33 pages.
U.S. Appl. No. 13/834,916, filed Mar. 15, 2013 Non-Final Rejection mailed Aug. 18, 2016, all pages.

\* cited by examiner

MAJORITY RULE SELECTION OF MEDIA CONTENT

BACKGROUND

In some social or public environments, such as an airport for example, there may be a number of televisions that are tuned to particular programming, such as a newscast. In this example, it may be not be uncommon that at least a portion of the viewing audience is interested in programming other than that being presented on the particular channel.

SUMMARY

This Summary does not in any way limit the scope of the claimed subject matter.

In an aspect, a computer-implemented method for enabling a mobile device to participate in selection of television programming for presentation by a display device external the mobile device is disclosed. The method may include determining, based on the indication of selection, whether a collective indication of selection tally of the particular television programming is greater than a collective indication of selection tally of other television programming. The method may include outputting the particular television programming for presentation by the display device when the particular television programming has a collective indication of selection tally greater than a collective indication of selection tally of other television programming.

In an aspect, a system including one or more processors and a memory communicatively coupled with and readable by the one or more processors is disclosed. The memory may have stored therein processor-readable instructions which, when executed by the one or more processors, cause the one or more processors to register a mobile device to participate in selection of television programming for presentation by a display device. The memory may have stored therein processor-readable instructions which, when executed by the one or more processors, cause the one or more processors to identify receipt of an indication from the mobile device of selection of particular television programming for presentation by the display device. The memory may have stored therein processor-readable instructions which, when executed by the one or more processors, cause the one or more processors to determine, based on the indication of selection, whether a collective indication of selection tally of the particular television programming is greater than a collective indication of selection tally of other television programming. The memory may have stored therein processor-readable instructions which, when executed by the one or more processors, cause the one or more processors to output the particular television programming for presentation by the display device when the particular television programming has a collective indication of selection tally greater than a collective indication of selection tally of other television programming.

In an aspect, a non-transitory processor-readable medium comprising processor-readable instructions is disclosed. The processor-readable instructions may be configured to cause one or more processors to, register a mobile device to participate in selection of television programming for presentation by a display device external the mobile device. The processor-readable instructions may be configured to cause one or more processors to identify an indication of selection of particular television programming for presentation by the display device received from the mobile device. The processor-readable instructions may be configured to cause one or more processors to determine, based on the indication of selection, whether a collective indication of selection tally of the particular television programming is greater than a collective indication of selection tally of other television programming. The processor-readable instructions may be configured to cause one or more processors to output the particular television programming for presentation by the display device when the particular television programming has a collective indication of selection tally greater than a collective indication of selection tally of other television programming.

BRIEF DESCRIPTION OF THE DRAWINGS

A further understanding of the nature and advantages of various embodiments may be realized by reference to the following figures. In the appended figures, similar components or features manual may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
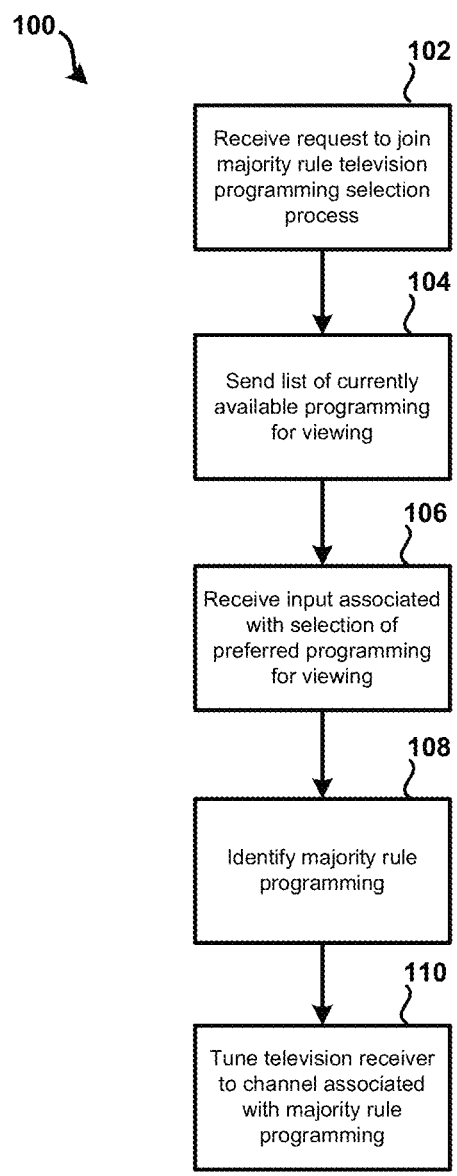
FIG. 1 shows a first example method in accordance with the present disclosure.

The present disclosure is directed towards enabling a majority of a group of television viewers to control what type of programming is currently being output for presentation by a display device. Such an implementation may, for example, be likened to a democratic process for choosing particular programming for display. Although described in the context of a satellite-based content distribution system, the various aspects of the present disclosure may generally be applicable to any scenario in which it is desirable to enable individuals within a group to participate in selection and consumption of media content. For example, referring now to FIG. 1, a first example method 100 is shown in accordance with the present disclosure. In particular, the method 100 as shown in FIG. 1 and its corresponding description may demonstrate a first example scenario in which a particular individual is enabled to participate in selection of television programming for viewing in a public or social environment. The example method 100 as described may be performed on or by a computing system or device, such as a television receiver. An example of such a computing system or device is discussed below in connection with at least FIG. 7.

The method 100 may include receiving (module 102), by a television receiver from a mobile device, a request to join a "majority rule" television programming selection process.

For example, a particular individual may enter a social or public environment, such as a sports bar, where there may be one or more televisions that are tuned to particular programming, such as a particular football game. The individual may have a mobile device, such as a smartphone, on their person. The mobile device may be configured to interact with the television receiver to enable the individual to control or have input as to what type of programming is currently being output by the television receiver to a television for presentation by the television. For example, when the individual (and the mobile device) is within a predetermined distance from the television receiver, such as within a radius of about 20-30 meters for example, the mobile device and the television receiver may establish a communication link, and the television receiver may receive a request from the mobile device to enroll, register, enlist, etc., the mobile device (and the individual) to join the majority rule television programming selection process. This may enable the individual to use the mobile device to have input as to what type of programming is currently being output by the television receiver to the television, for presentation by the television.

For example, the method 100 may further include sending (module 104), by the television receiver to the mobile device, a list or listing of television programming currently available for viewing. In general, "currently" available television programming may refer to recorded content or live content. In the present example, content of the listing may be similar to that which may be displayed in an EPG (Electronic Programming Guide). For example, the list may at least present various information related to television channels and the timing of programs or programming appearing on such television channels. For example, the listing may display channel information associated with a channel 2009, where a football game Broncos vs. Ravens may be listed as scheduled to appear on the channel 2009 during a particular time period 1-4:30 PM of a particular day Jan. 16, 2013 (see e.g., FIG. 3). For the sake of example, the list may further display channel information associated with a channel 2012, where a football game Packers vs. 49ers may be listed as scheduled to appear on the channel 2012 during the particular time period 1-4:30 PM of the particular day Jan. 16, 2013 (see e.g., FIG. 3). Other embodiments are possible.

Continuing with the present example, assuming that a current time is sometime during the particular time period 1-4:30 PM of the particular day Jan. 16, 2013, the television receiver may send to the mobile device a listing that when displayed by the mobile device at least designates or specifies that the Broncos vs. Ravens game and the Packers vs. 49ers game are currently available for viewing. In some instances, it may be that one of these football games is currently being output by the television receiver to the television for presentation by the television. For example, the Broncos vs. Ravens game may be currently playing on one or more televisions of or within the sports bar. However, it may be that the particular individual after entering the sports bar is more interested in watching the Packers vs. 49ers game on the television, because the individual may be a Green Bay Packers fan for example. In accordance with the present disclosure, at least the television receiver and the mobile device together may be configured to enable to the individual to "cast a vote," and have input as to whether the television(s) and/or television receiver of the sports bar is tuned to the Broncos vs. Ravens game or the Packers vs. 49ers game.

For example, the method 100 may further include receiving (module 106), by the television receiver from the mobile device, input associated with selection of particular programming preferred for viewing by the particular individual. For example, the individual may navigate the listing as received by the television receiver (module 104) and presented by the mobile device, and interact with the list to "select" the Packers vs. 49ers game as preferred programming for viewing. An example of such an interaction with a mobile device is described in further detail below in connection with at least FIG. 3. Upon selection of the Packers vs. 49ers game, the mobile device may send to the television receiver an indication that represents the selection of the Packers vs. 49ers game by the individual. Such an implementation may be likened to a "cast vote" by the particular individual, in favor of watching the Packers vs. 49ers game on the television. In accordance with the present disclosure, the television receiver may take into account the cast vote by the particular individual, and determine whether a majority of individuals taking part in the majority rule television programming selection process are in favor of watching the "Packers vs. 49ers" game. If so, the television receiver may, automatically or in response to input by an authorized individual (e.g., an individual in the "majority"), change tuning such that the Packers vs. 49ers game corresponds to programming currently being output by the television receiver to the television for presentation by the television, assuming that the Broncos vs. Ravens game is currently output by the television receiver to the television for presentation by the television.

For example, the method 100 may further include identifying (module 108), by the television receiver, particular programming of currently available programming that is "majority rule programming." Majority rule programming may refer to programming having a "greatest" number of individuals in favor of watching the same. For example, upon receiving input associated with selection of programming preferred for viewing by the particular individual (see module 106), the television receiver may "tally the vote" and determine, based on an updated tally, which programming of currently available programming has the "greatest" number of individuals in favor of watching the same. For example, and assuming for simplicity that the only currently available programming is the Broncos vs. Ravens game and the Packers vs. 49ers game, the television receiver may determine that five (5) individuals are in favor of watching the Broncos vs. Ravens game, and that six (6) individuals are in favor of watching the Packers vs. 49ers game. In this example, the vote by the particular individual in favor of watching the Packers vs. 49ers game tipped the scales such the Packers vs. 49ers game has the majority vote, and may be considered the majority rule programming. In accordance with the present disclosure, and continuing with the example scenario, the television receiver may take into account this new majority rule programming and change tuning from the Broncos vs. Ravens game such that the Packers vs. 49ers game corresponds to programming currently being output by the television receiver to the television for presentation by the television.

For example, the method 100 may further include tuning (module 110), by the television receiver, the television receiver from a channel associated with first programming to a channel associated with majority rule programming. For example, the television receiver may change tuning from the Broncos vs. Ravens game to the Packers vs. 49ers game such that the Packers vs. 49ers game corresponds to programming currently being output by the television receiver to the television for presentation by the television. As mentioned above, this may in one embodiment be implemented "automatically" by the television receiver, without further user input, upon identification of majority rule programming (see module 108). In other embodiments, the television receiver may configure itself such that an "authorized" individual, such as an individual in the "majority," may use their mobile device to switch programming from the Broncos vs. Ravens game to the Packers vs. 49ers game. Here, the television receiver may further configure itself such that an "unauthorized" individual, such as an individual in the "minority," may not use their mobile device to switch programming from the Broncos vs. Ravens game to the Packers vs. 49ers game. For example, an individual in the "minority" may attempt to change the channel back to the Broncos vs. Ravens game, but the television receiver may not respond to the command. Other embodiments are possible.

Such an implementation as described in connection with FIG. 1 may be beneficial and/or advantageous in many respects. For example, it may be possible that a particular group of friends come together and collectively decide that they would like to go to the sports bar discussed above to watch the Packers vs. 49ers game. In many instances, it may be that the friends arrive at the sports bar only to find that they do not have control or input as to what is being displayed on a television(s) for viewing. For example, the television(s) may be tuned to the Broncos vs. Ravens game and staff or servers of the sports bar may be too busy or unwilling to change the channel to the Packers vs. 49ers game. Further, there may be a number of Broncos fans in the sports bar who may object to changing the channel from the Broncos vs. Ravens game to the Packers vs. 49ers game. In accordance with the present disclosure, however, the particular group of friends may enter the sports bar and have control or input as to what type of programming is currently being displayed by the television(s). Among other things, this may be a powerful marketing device for the sports bar. For example, the sports bar may advertise that "large" groups who frequent or enter the sports bar may, by virtue of their numbers, potentially have control over what is being displayed by one or more televisions within the sports bar. The sports bar may benefit from increased sales due to "large" numbers of patrons frequenting the sports bar. The "large" numbers of patrons may benefit due to being able to go out into a social environment with friends, colleagues, etc., and still be able to watch programming that they may be interested in.

Further scenarios and beneficial aspects associated with enabling a majority of a group of television viewers to control what type of programming is currently being output for presentation by a display device may be understood in light of the following description in connection with FIGS. 2-7.

Figure 2:
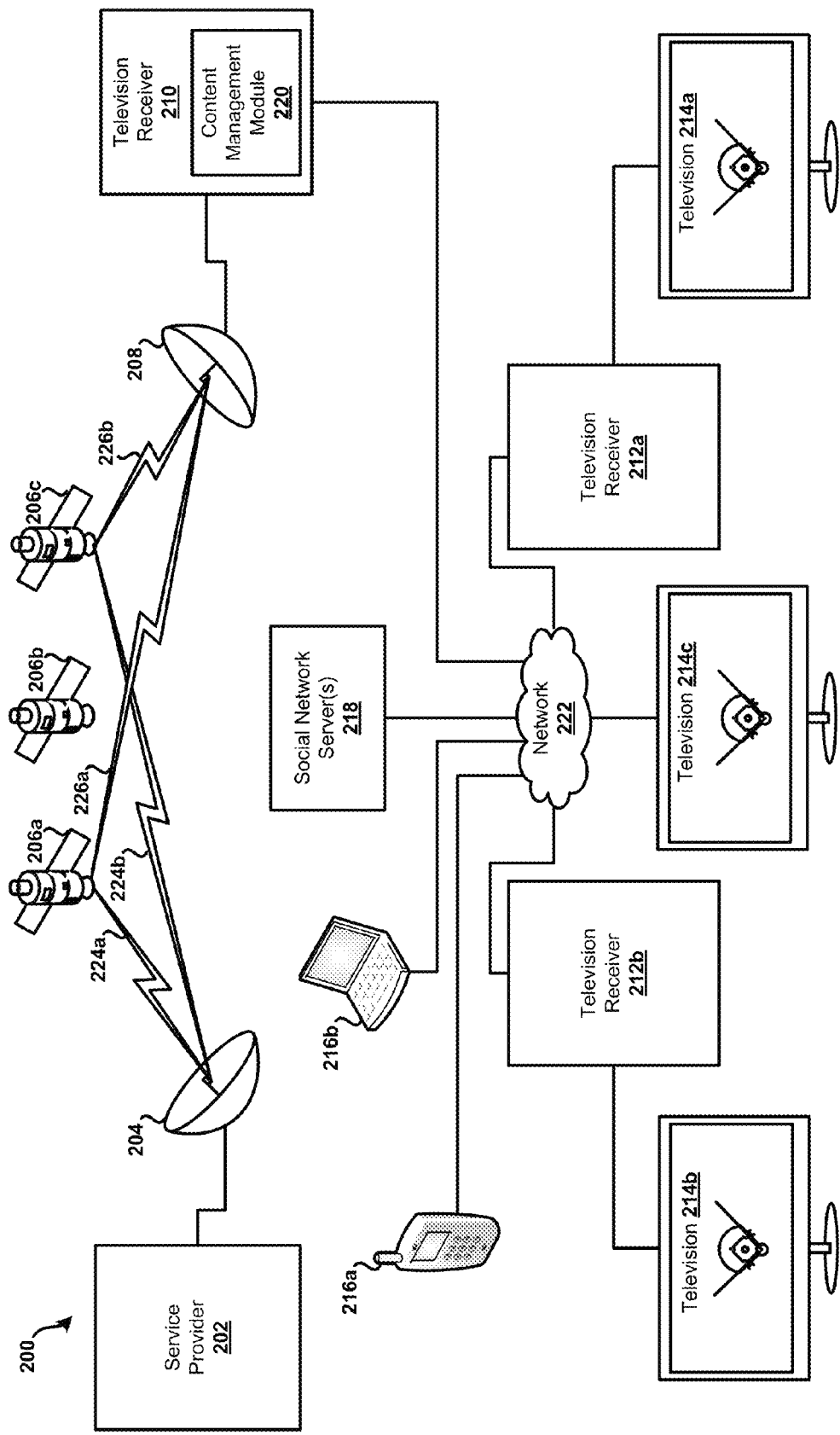
FIG. 2 shows an example media content distribution system.

For example, referring now to FIG. 2 an example media content distribution system 200 is shown in which aspects of the present disclosure may be implemented. For brevity, the system 200 is depicted in a simplified and conceptual form, and may generally include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of media or content distribution system.

The example system 200 may include a service provider 202, a satellite uplink 204, a plurality of orbiting (e.g., geosynchronous) satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one social network server 218. In the present example, the PTR 210 may at least include a content management module 220. The content management module 220 may in one aspect be configured for enabling a majority of a group of television viewers to control what type of programming is currently being output for presentation by a display device, as discussed further below.

The system 200 may also include at least one network 222 that establishes a bi-directional communication path for data transfer between and among the PTR 210, STRs 212a-b, televisions 214a-c, computing devices 216a-b, and social network server 218 of the example system 200. In some embodiments, the network 222 may further establish a bi-directional communication path (not shown) for data transfer between the PTR 210 and the service provider 202. The network 222 is intended to represent any number of terrestrial and/or non-terrestrial network features or elements. For example, the network 222 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, and/or any other type of communication network(s) configured such that data may be transferred between and among respective elements of the example system 200.

The PTR 210, and the STRs 212a-b, as described throughout may generally be any type of television receiver, such as a STB (Set-Top-Box) for example. In another example, the PTR 210, and the STRs 212a-b, may exhibit functionality integrated as part of or into a television, a DVR, a computer such as a tablet computing device, or any other computing system or device, as well as variations thereof. Further, the PTR 210 and the network 222, together with the STRs 212a-b, televisions 214a-c, and possible computing devices 216a-b, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Still other embodiments are possible.

For example, the PTR 210 and the network 222, together with the STRs 212a-b, televisions 214a-c, and possible computing devices 216a-b, may form at least a portion of a computing network other than a home computing network, such as a network associated with a particular social or public establishment, such as a sports bar, airport, physician's office, government office, etc. In such an implementation, the respective elements of the example system 200 may each be respectively configured so as to enable communications in accordance with any particular communication protocol(s) and/or standard(s).

In practice, the satellites 206a-c may each be configured to receive uplink signals 224a-b from the satellite uplink 204. In this example, the uplink signals 224a-b may contain one or more transponder streams of particular data or content, such as particular television channel, that is supplied by the service provider 202. For example, each of the respective uplink signals 224a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c. Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc.

The satellites 206a-c may further be configured to relay the uplink signals 224a-b to the satellite dish 208 as downlink signals 226a-b. Similar to the uplink signals 224a-b, each of the downlink signals 226a-b may contain one or more transponder streams of particular data or content, such as various encoded and/or at least partially electronically scrambled television channels, on-demand programming, etc., in accordance with an allotted carrier frequency and bandwidth. The downlink signals 226a-b, however, may not necessarily contain the same or similar content as a corresponding one of the uplink signals 224a-b. For example, the uplink signal 224a may include a first transponder stream containing at least a first group or grouping of television channels, and the downlink signal 226a may include a second transponder stream containing at least a second, different group or grouping of television channels. In other examples, the first and second group of television channels may have one or more television channels in common. In sum, there may be varying degrees of correlation between the uplink signals 224a-b and the downlink signals 226a-b, both in terms of content and underlying characteristics.

Continuing with the example implementation scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 226a-b, from one or more of the satellites 206a-c. Based on the characteristics of the PTR 210 and/or satellite dish 208, however, it may only be possible to capture transponder streams from a limited number of transponders concurrently. For example, a tuner of the PTR 210 may only be able to tune to a single transponder stream from a transponder of a single satellite, such as satellite 206a, at a time.

Additionally, the PTR 210, which is communicatively coupled to the satellite dish 208, may subsequently select via tuner, decode, and relay particular transponder streams to the television 214c for display thereon (see e.g., FIG. 4 and associated description). For example, the satellite dish 208 and the PTR 210 may, respectively, be configured to receive, decode, and relay at least one premium HD-formatted television channel to the television 214c. Programming or content associated with the HD channel may generally be presented "live," or from a recording as previously stored on, by, or at the PTR 210. In this example, the HD channel may be output to the television 214c in accordance with the HDMI/HDCP content protection technologies. Other embodiments are possible. For example, in some embodiments, the HD channel may be output to the television 214c in accordance with the MoCA® (Multimedia over Coax Alliance) home entertainment networking standard. Still other embodiments are possible.

Further, the PTR 210 may select via tuner, decode, and relay particular transponder streams to one or both of the STRs 212a-b, which may in turn relay particular transponder streams to a corresponding one of the television 214a and the television 214a for display thereon. For example, the satellite dish 208 and the PTR 210 may, respectively, be configured to receive, decode, and relay at least one television channel to the television 214a by way of the STR 212a. Similar to the above-example, the television channel may generally be presented "live," or from a recording as previously stored on the PTR 210, and may be output to the television 214a by way of the STR 212a in accordance with a particular content protection technology and/or networking standard. Other embodiments are possible.

Still further, the satellite dish 208 and the PTR 210 may, respectively, be configured to receive, decode, and relay at least one premium television channel to one or both of the computing devices 216a-b. Similar to the above-examples, the television channel may generally be presented "live," or from a recording as previously stored on the PTR 210, and may be output to one or both of the computing devices 216a-b in accordance with a particular content protection technology and/or networking standard. Other embodiments are possible.

Figure 3:
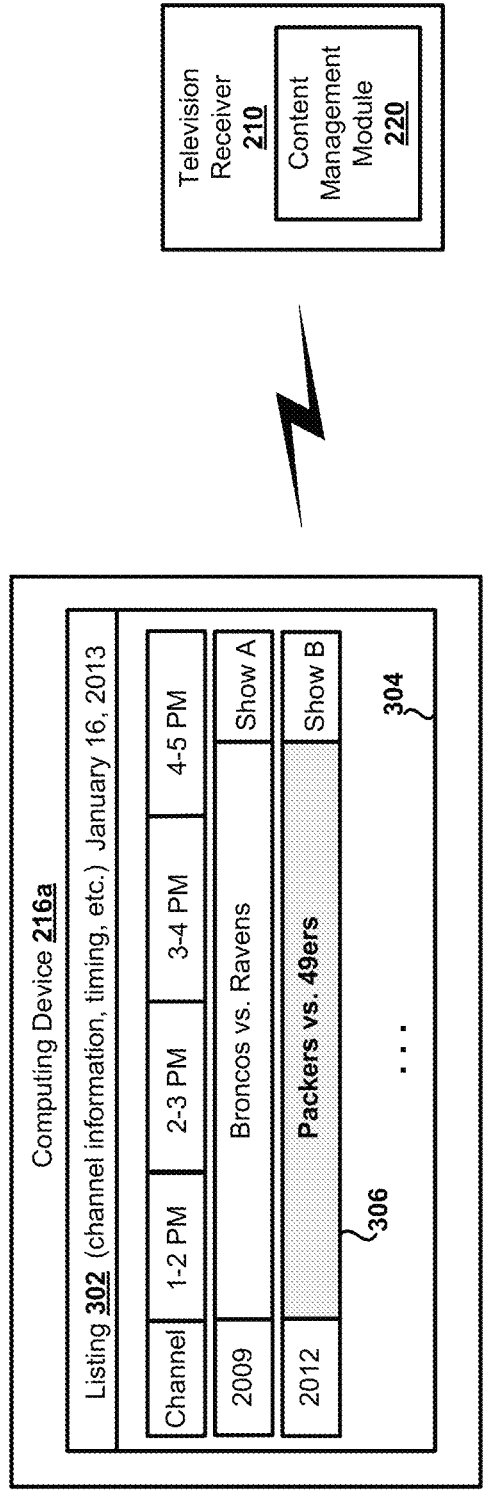
FIG. 3 shows aspects of the system of FIG. 2 in further detail.

Referring now to FIG. 3, aspects of the example system 200 of FIG. 2 are shown in further detail. In particular, the PTR 210 may be configured to output an interactive listing 302 to and for presentation by at least the computing device 216a of FIG. 2. The computing device 216a may at least include or exhibit a multi-touch display 304. In the present example, the listing 302 may present various information related to television channels and the timing of programs or programming appearing on such television channels, such as programs or programming as received from one or more of the satellites 106a-c. For example, the listing 302 may display channel information associated with a channel 2009, where a football game Broncos vs. Ravens may be listed as scheduled to appear on the channel 2009 during a particular time period 1-4:30 PM of a particular day Jan. 16, 2013. The listing 302 may further display channel information associated with a channel 2012, where a football game Packers vs. 49ers may be listed as scheduled to appear on the channel 2012 during the particular time period 1-4:30 PM of the particular day Jan. 16, 2013. Other embodiments are possible. For example, more or fewer programs or programming may be listed within the listing 302. Further, programming listed within the listing 302 may correspond to recorded content or "live" content. Still other embodiments are possible.

In the example of FIG. 3, and assuming that a current time is sometime during the time period 1-4:30 PM of the particular day Jan. 16, 2013, a user may interact with the listing 302 to select the Packers vs. 49ers game as preferred programming for viewing, as part of a majority rule television programming selection process such as described above in connection with FIG. 1. For example, a user may "touch" or "tap" a cell or block 306 within the listing 302 associated with the Packers vs. 49ers game to select this game as preferred program for viewing, indicated by light stipple-shading in FIG. 3. The computing device 216a may then send, by wireless communication channel for example, to the PTR 210 an indication that represents the selection by the particular individual of the Packers vs. 49ers game as preferred programming. An example of such a communication between the computing device 216a and the PTR 210 is described below in connection with at least FIG. 5.

Figure 4:
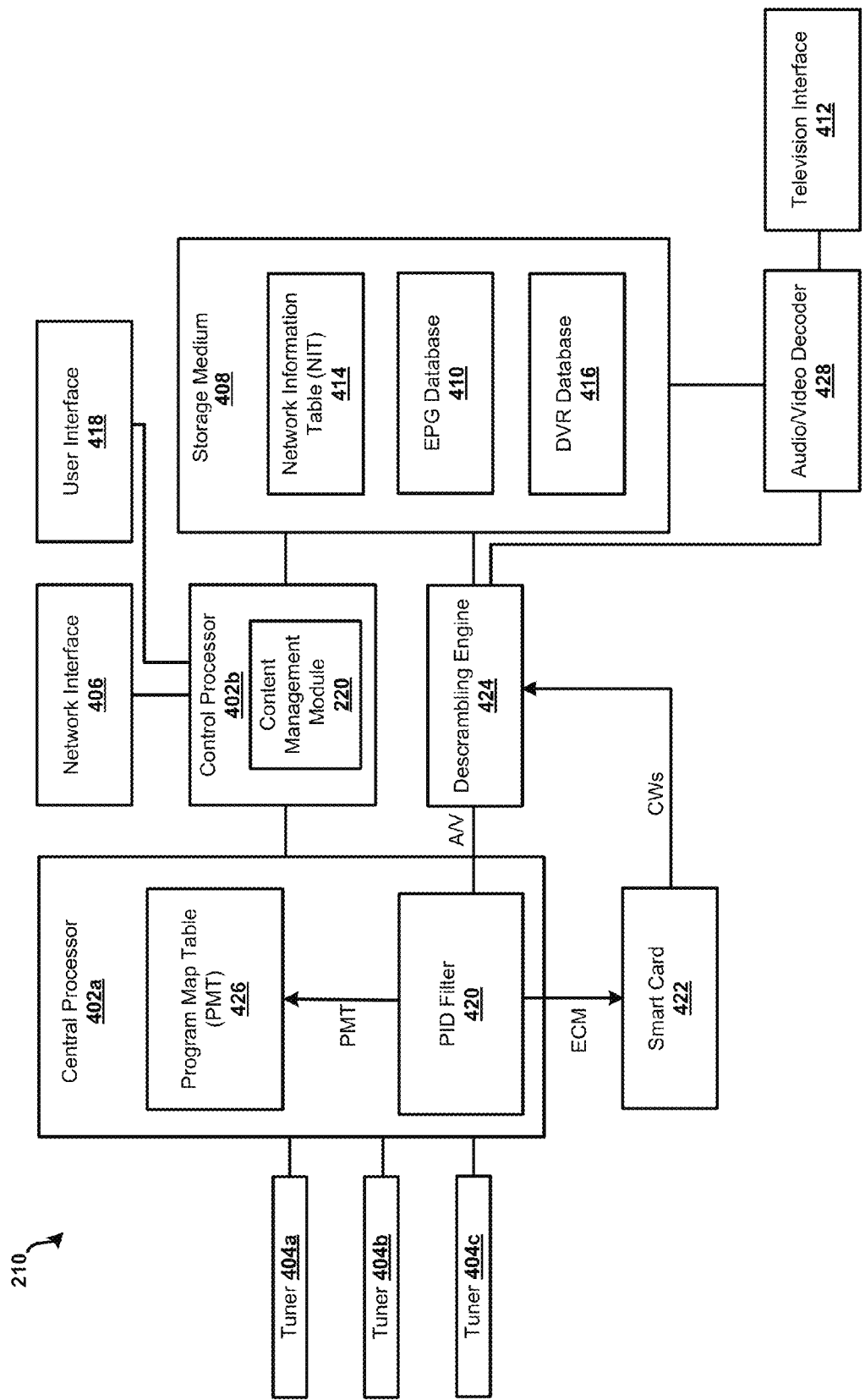
FIG. 4 shows an example block diagram of a television receiver of FIG. 2.

Referring now to FIG. 4, a simplified block diagram of the PTR 210 of FIG. 2 is shown in accordance with the present disclosure. In some embodiments, at least one of the STRs 212a-b may be configured in a manner similar to that of the PTR 210. In other embodiments, at least one of the STRs 212a-b may be configured to exhibit a reduced functionality as compared to the PTR 210, and may depend at least to a certain degree on the PTR 210 to implement certain features or functionality. In this example, the STRs 212a-b may be referred to as a "thin client."

For brevity, the PTR 210 is depicted in a simplified and conceptual form, and may generally include more or fewer elements or components as desired in accordance with the present disclosure. For example, the PTR 210 is shown in FIG. 4 to include the content management module 220 as mentioned above in connection with FIG. 2. Additionally, although not explicitly shown in FIG. 4, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such a functionality. Additionally, the PTR 210 may be configured to include any number of other various components or logical modules that are implemented in hardware, software, firmware, or any combination thereof, and such components or logical modules may or may not be implementation-specific.

In some embodiments, the PTR 210 and/or the STRs 212a-b comprises of a STB. In addition to being in the form of an STB, at least the PTR 210 may be incorporated into another device, such as the television 214c as shown in FIG. 2. For example, the television 214c may have an integrated television receiver that does not involve an external STB being coupled with the television 214c. A STB may contain some or all of the components of the PTR 210 and/or may be able to perform some or all of the functions of the PTR 210. Accordingly, instances in this document referring to a STB, and steps being performed by a STB, may also be performed, more generally, by the PTR 210 and/or STRs 212a-b.

Referring still to FIG. 4, the PTR 210 may include the content management module 220 as shown in FIG. 2, at least one processor 402, including a central processor 402a and a control processor 402b, a plurality of tuners 404a-c, at least one network interface 406, at least one non-transitory computer-readable storage medium 408, at least one EPG database 410, at least one television interface 412, at least one NIT (Networking Information Table) 414, at least one DVR database 416, at least one user interface 418, at least one PID filter 420, at least one smart card 422, at least one descrambling engine 424, at least one PMT (Program Map Table) 426, and at least one decoder 428. In other embodiments of the PTR 210, fewer or greater numbers of components may be present. Further, functionality of one or more components may be combined; for example, functions of the descrambling engine 424 may be performed by the central processor 402a. Still further, functionality of components may be spread among additional components. For example, the PID filter 420 may be handled by hardware and/or software separate from the PMT 426.

The processor 402 may include one or more specialized and/or general-purpose processors configured to perform processes such as tuning to a particular channel, accessing and displaying EPG information from the EPG database 410, and/or receiving and processing input from a user. For example, processor 402 may include one or more processors dedicated to decoding video signals from a particular format, such as MPEG (Moving Picture Experts Group), for output and display on a television and for performing decryption.

The control processor 402b may communicate with the central processor 402a. The control processor 402b may control the recording of television channels based on timers stored in the DVR database 416. The control processor 402b may initiate recording of a television channel by sending a record command along with an indication of the television channel to be recorded to the central processor 402a. The control processor 402b may not send a second record command, when additional recording is to begin at the same time, until an acknowledgement that recording of the first television channel has successfully been received and initiated by the central processor 402a. The control processor 402b may also provide commands to the central processor 402a when recording of a television channel is to cease. In addition to providing commands relating to the recording of television channels, the control processor 402b may provide commands to the central processor 402a that indicate television channels to be output to the decoder 428 for output to a presentation device, such as the television 214c for example.

The control processor 402b may also communicate with the network interface 406 and the user interface 418. The control processor 402b may handle in-coming data from the network interface 406 and the user interface 418. Additionally, the control processor 402b may be configured to output data via the network interface 406.

The tuners 404a-c may be used to tune to television channels, such as television channels transmitted via satellite or cable, such as satellites 206a-c. Each respective one of the tuner 404a-c may be capable of receiving and processing a single stream of data from a satellite transponder, or a cable RF channel, at a given time. As such, a single tuner may tune to a single transponder or, for a cable network, a single cable RF channel. Additionally, one tuner (e.g., tuner 404a) may be used to tune to a television channel on a first transponder stream for display using a television, while another tuner (e.g., tuner 404b) may be used to tune to a television channel on a second transponder for recording and viewing at some other time. Still another tuner (e.g., tuner 404c) may be used to check various television channels to determine if they are available or not. If multiple television channels transmitted on the same transponder stream are desired, a particular tuner (e.g., tuner 404a) may be used to receive the signal containing the multiple television channels for presentation and/or recording. The tuners 404a-c may receive commands from the central processor 402a. Such commands may instruct the tuners 404a-c which frequencies are to be used for tuning.

The network interface 406 may be used to communicate via an alternate communication channel with a television service provider. For example, the primary communication channel may be via satellite, which may be unidirectional to the STB, and the alternate communication channel, which may be bidirectional, may be via a network, such as the Internet. The PTR 210 may be able to communicate with the service provider 202 of FIG. 2 via a network, such as the Internet. This communication may be bidirectional. For example, data may be transmitted from the PTR 210 to the service provider 202, and from the service provider 202 to the PTR 210. The network interface 406 may be configured to communicate via one or more networks, such as the Internet, to communicate with the service provider 202. Information may be transmitted and/or received via the network interface 406.

The storage medium 408 may represent a non-transitory computer-readable storage medium. The storage medium 408 may include memory and/or a hard drive. The storage medium 408 may be used to store information received from one or more satellites and/or information received via the network interface 406. The storage medium 408 may store information related to the EPG database 410, the NIT 414, and/or the DVR database 416. Recorded television programs may be stored using the storage medium 408. The storage medium 408 may be partitioned or otherwise divided such that predefined amounts of the storage medium 408 are devoted to storage of omnibus channel files and user-selected television programs.

The EPG database 410 may store information related to television channels and the timing of programs appearing on such television channels. The EPG database 410 may be stored using the storage medium 408, which may be a hard drive. Information from the EPG database 410 may be used to inform users of what television channels or programs are popular and/or provide recommendations to the user. Information from the EPG database 410 may provide the user with a visual interface displayed by a television that allows a user to browse and select television channels and/or television programs for viewing and/or recording. Information used to populate the EPG database 410 may be received via the network interface 406 and/or via satellites, such as satellites 206*a*-*c* of FIG. 2 via the tuners 404*a*-*c*. For instance, updates to the EPG database 410 may be received periodically via satellite. The EPG database 410 may serve as an interface for a user to control DVR functions of the PTR 210, and/or to enable viewing and/or recording of multiple television channels simultaneously.

In addition to being used to provide users with information about scheduled programming, information from the EPG database 410 may be used to determine when television programs begin and end for the purposes of recording. For instance, when a channel-specific file is recorded that contains multiple television channels, the start and end of time of specific television programs within the channel-specific file may be based on the start and end times indicated in the EPG database 410. Other data may be stored within the EPG database 410 that may be useful in managing channel-specific files, such as series identifiers and episode identifiers, which may be used by a television service provider to identify particular television programs.

The decoder 428 may serve to convert encoded video and audio into a format suitable for output to a display device. For instance, the decoder 428 may receive MPEG video and audio from the storage medium 408, or the descrambling engine 424, to be output to a television. MPEG video and audio from the storage medium 224 may have been recorded to the DVR database 416 as part of a previously-recorded television program. The decoder 428 may convert the MPEG video and audio into a format appropriate to be displayed by a television or other form of display device and audio into a format appropriate to be output from speakers, respectively.

The television interface 412 may serve to output a signal to a television, or another form of display device, in a proper format for display of video and playback of audio. As such, the television interface 412 may output one or more television channels, stored television programming from the storage medium 408, such as television programs from the DVR database 416 and/or information from the EPG database 410 for example, to a television for presentation.

The NIT 414 may store information used by the PTR 210 to access various television channels. The NIT 414 may be stored using the storage medium 408. Information used to populate the NIT 414 may be received via satellite, or cable, via the tuners 404*a*-*c* and/or may be received via the network interface 406 from a service provider. As such, information present in the NIT 414 may be periodically updated. The NIT 414 may be locally-stored by the PTR 210 using the storage medium 408. Information that may be present in the NIT 414 may include, for example: television channel numbers, a satellite identifier, a frequency identifier, a transponder identifier, an ECM (Entitlement Control Message) PID (Packet Identifier), one or more audio PIDs, and a video PID. A second audio PID of a channel may correspond to a SAP (Second Audio Program) program, such as in another language. In some embodiments, the NIT 414 may be divided into additional tables. For example, rather than the specific audio PIDs and video PIDs being present in the NIT 414, a channel identifier may be present within NIT 414 which may be used to look up the audio PIDs and video PIDs in another table, such as the PMT 426. For example, the PMT 426 may store information on audio PIDs and video PIDs for television channels that are transmitted on a transponder frequency.

Table 1 provides a simplified example of the NIT 414 for several television channels. It should be understood that in other embodiments, many more television channels may be represented in the NIT 414. The NIT 414 may be at least periodically updated by a television service provider. As such, television channels may be reassigned to different satellites and/or transponders, and the PTR 210 may be able to handle this reassignment as long as the NIT 414 is updated.

TABLE 1

| Channel | Satellite | Transponder | ECM PID | PMT PID |
|---------|-----------|-------------|---------|---------|
| 4 | 1 | 2 | 27 | 1001 |
| 5 | 2 | 11 | 29 | 1002 |
| 7 | 2 | 3 | 31 | 1001 |
| 13 | 2 | 4 | 33 | 1004 |

Based on information in the NIT 414, it may be possible to determine the proper satellite and transponder to which to tune for a particular television channel. In some embodiments, the NIT 414 may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 414. Additional information on how the NIT 414, as indicated in Table 1, may be used is provided in reference to FIG. 4. The same PID may be reused on different transponders.

A DVR may permit a television channel to be recorded for a period of time. DVR functionality of the PTR 210 may be managed by the control processor 402*b*. The control processor 402*b* may coordinate the television channel, start time, and stop time of when recording of a television channel is to occur. The DVR database 416 may store information related to the recording of television stations. The DVR database 416 may store timers that are used by the control processor 402*b* to determine when a television channel should be tuned to and its programs recorded to the DVR database 416. However, other embodiments are possible. For example, in some embodiments, the storage medium 408 may store timers. Timer files may be defined as a daily_schedule_db.dat file and a gloal_timer_db.dat file. In general, when a "new" timer is created, a "new" entry may be added into the daily_schedule_db.dat and gloal_timer_db.dat files, which may include all timer related information such as channel number, start time, duration, etc. Further, a limited amount of the storage medium 408 may be devoted to the DVR database 416. Timers may be set by a service provider and/or one or more users of the PTR 210.

DVR functionality of the control processor 402*b* may have multiple modes. For example, DVR functionality of the control processor 402*b* may be configured to record individual television programs selected by a user to the DVR database 416. Using the EPG database 410, a user may select a particular television program. Based on the date, time period, and television channel indicated by the EPG database 410, the control processor 402*b* may record the associated television program to the DVR database 416. In another example, the DVR database 416 may be used to store recordings of predefined periods of time on one or more television channels. These predefined periods of time may include one or more television programs. For example, primetime on a particular television network may be recorded each weekday night. Further, multiple television channels may be recorded for such predefined periods of time. Such recording of television channels for predefined periods of time may be defined by a television service provider (e.g., service provider 202).

As an example of this second mode of DVR functionality, a television service provider may configure the PTR 210 to record television programming on multiple, predefined television channels for a predefined period of time, on predefined dates. For instance, a television service provider may configure the PTR 210 such that television programming may be recorded from 7 PM to 10 PM on the NBC, ABC, CBS, and FOX networks each weeknight. When a television program is selected for recording by a user and is also specified for recording by the television service provider, the user selection may serve as an indication to save the television program for an extended time, beyond the time which the predefined recording would otherwise be saved.

The user interface 418 may include a remote control, physically separate from PTR 210, and/or one or more buttons on the PTR 210 that allows a user to interact with the PTR 210. The user interface 418 may be used to select a television channel for viewing, view information from the EPG database 410, and/or program a timer stored to the DVR database 416 wherein the timer may be used to control the DVR functionality of the control processor 402*b*.

Referring back to tuners 404*a-c*, television channels received via satellite, or cable, may contain at least some scrambled data. Packets of audio and video may be scrambled to prevent unauthorized users, such as nonsubscribers, from receiving television programming without paying the television service provider. When one of the tuners 404*a-c* is receiving data from a particular transponder of a satellite, the transponder stream may be a series of data packets corresponding to multiple television channels. Each data packet may contain a PID, which, in combination with the NIT 414 and/or the PMT 426, can be determined to be associated with particular television channel. Particular data packets, referred to as ECMs may be periodically transmitted. ECMs may be associated with another PID and may be encrypted; the PTR 210 may use the smart card 422 to decrypt ECMs. Decryption of an ECM may only be possible when the user (e.g., PTR 210) has authorization to access the particular television channel associated with the ECM. When an ECM is determined to correspond to a television channel being stored and/or displayed, the ECM may be provided to the smart card 422 for decryption.

When the smart card 422 receives an encrypted ECM, the smart card 422 may decrypt the ECM to obtain some number of control words. In some embodiments, from each ECM received by the smart card 422, two control words are obtained. In some embodiments, when the smart card 422 receives an ECM, it compares the ECM to the previously received ECM. When the two ECMs match, the second ECM is not decrypted because the same control words would be obtained. In other embodiments, each ECM received by the smart card 422 is decrypted; however, when a second ECM matches a first ECM, the outputted control words will match; thus, effectively, the second ECM does not affect the control words output by the smart card 422. The smart card 422 may be permanently part of the PTR 210 or may be configured to be inserted and removed from PTR 210.

The central processor 402*a* may be in communication with the tuners 404*a-c* and the control processor 402*b*. The central processor 402*a* may be configured to receive commands from the control processor 402*b*. Such commands may indicate when to start/stop recording a television channel and/or when to start/stop causing a television channel to be output to a television. The central processor 402*a* may control the tuners 404*a-c*. The central processor 402*a* may provide commands to the tuners 404*a-c* that instruct the tuners which satellite, transponder, and/or frequency to tune to. From the tuners 404*a-c*, the central processor 402*a* may receive transponder streams of packetized data. As previously detailed, some or all of these packets may include a PID that identifies the content of the packet.

The central processor 402*a* may be configured to create at least one PID filter 420 that sorts packets received from the tuners 404*a-c* based on the PIDs. When a tuner is initially tuned to a particular frequency, such as a particular transponder of a satellite, a PID filter may be created based on a PID of PMT data. The PID of PMT data packets may be known because it is stored as part of the NIT 414. From the PMT data packets, the PMT 426 may be constructed by central processor 402*a*. Table 2 provides an exemplary extract of a PMT. The PMT 426 may be specific to a particular transponder. As such, when tuning to a different transponder occurs, a new PMT may be created for the different transponder.

TABLE 2

| Channel | Video PID | $1^{st}$ Audio PID | $2^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in the PMT 426, the audio and video PIDs for specific television channels may be identified. A television channel may have multiple audio PIDs due to a second audio program, which may be in a different language.

It should be understood that the values provided in Table 2 are for example purposes only. Actual values may vary. Additional information or less information may also be stored in the PMT 426.

The PID filter 420 may be configured to filter data packets based on PIDs. In some embodiments, the PID filter 420 is created and executed by central processor 402*a*. In other embodiments, separate hardware may be used to create and execute multiple PID filters. Depending on a television channel selected for recording/viewing, a PID filter may be created to filter the video and audio packets associated with the television channel, based on the PID assignments present in the PMT 426. For example, when a transponder data stream includes multiple television channels, data packets corresponding to a television channel that is not desired to be stored or displayed by the user, may be ignored by PID filters. As such, only data packets corresponding to the one or more television channels desired to be stored and/or displayed may be filtered and passed to either the descrambling engine 424 or the smart card 422; other data packets may be ignored. For each television channel, a stream of video packets, a stream of audio packets, one or both of the audio programs, and/or a stream of ECM packets may be present, each stream identified by a PID. In some embodiments, a common ECM stream may be used for multiple television channels. Additional data packets corresponding to other information, such as updates to the NIT 414, may be appropriately routed by the PID filter 420. At a given time, one or multiple PID filters may be executed by the central processor 402*a*.

The descrambling engine 424 may use the control words output by the smart card 422 in order to descramble video and/or audio corresponding to television channels for storage and/or presentation. Video and/or audio data contained in the transponder data stream received by the tuners 404*a-c* may be scrambled. Video and/or audio data may be descrambled by descrambling engine 424 using a particular control word. Which control word output by the smart card 422 to be used for successful descrambling may be indicated by a scramble control identifier present within the data packet containing the scrambled video or audio. Descrambled video and/or audio may be output by the descrambling engine 424 to the storage medium 408 for storage in the DVR database 416 and/or to the decoder 428 for output to a television or other presentation equipment via the television interface 412.

For simplicity, the PTR 210 of FIG. 4 has been reduced to a block diagram; commonly known parts, such as a power supply, have been omitted. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules. Further, the components of the PTR 210 may be part of another device, such as built into a television. Also, while the PTR 210 may be used to receive, store, and present television channels received via a satellite, it should be understood that similar components may be used to receive, store, and present television channels via a cable network.

Figure 5:
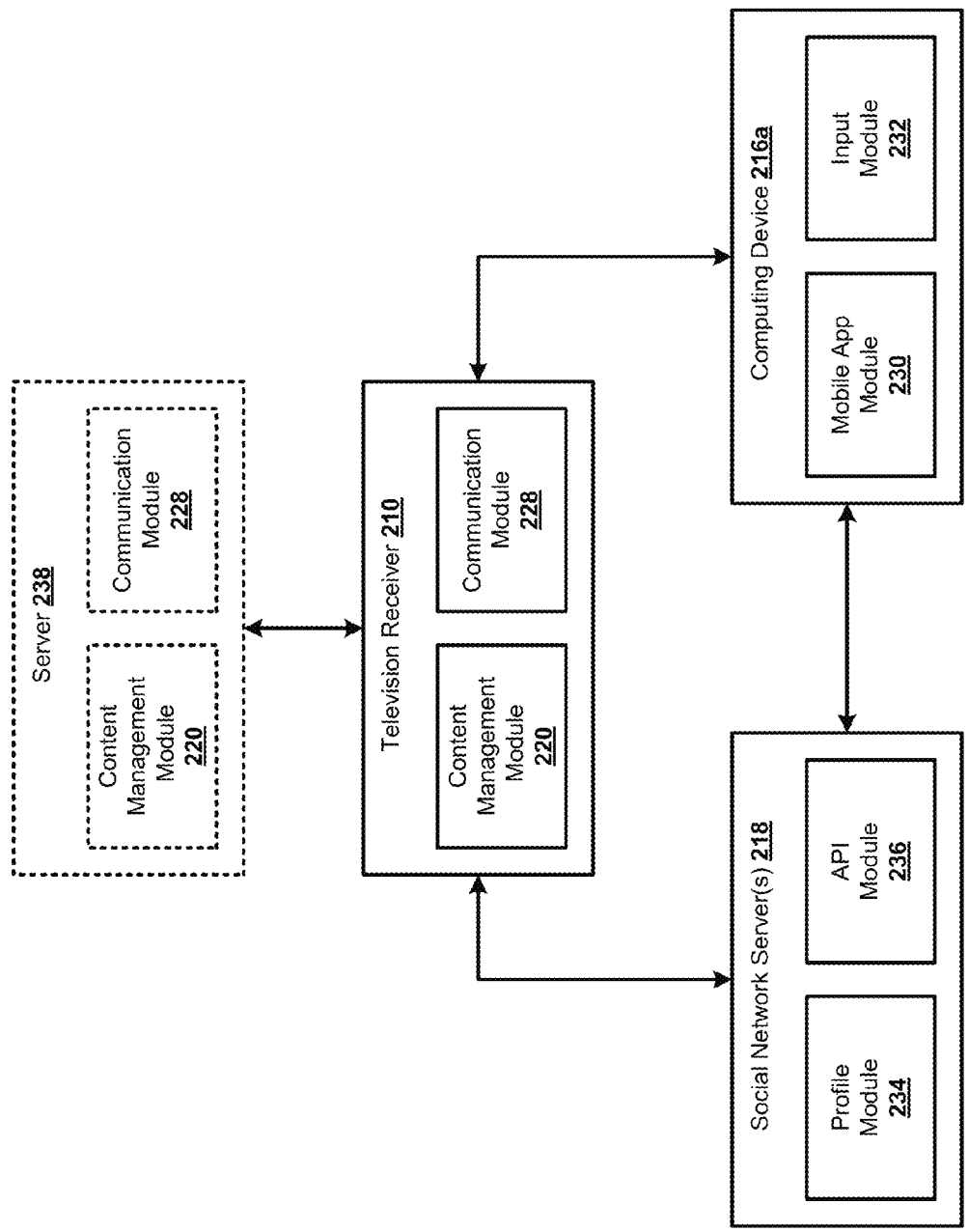
FIG. 5 shows an example block diagram of particular components of the system of FIG. 2.

Referring now to FIG. 5, a block diagram is shown illustrating particular components of the example system 200 of FIG. 2. More specifically, FIG. 5 shows the PTR 210, the computing device 216*a*, and the social network server 218 of FIG. 2 in further detail. For example, the PTR 210 may at least include the content management module 220 and a communication module 228. The computing device 216*a* may at least include a mobile application module 230 and an input module 232. The social network server 218 may at least include a profile module 234 and an API (Application Programming Interface) module 236. Other embodiments are possible. For example, in some embodiments, one or more respective components of the PTR 210 as shown in FIG. 5 may be wholly or at least partially located on one or more other components of the example system 200 of FIG. 2. For example, one or more respective components of the PTR 210 as shown in FIG. 5 may be wholly or at least partially located on a particular one of the STRs 212*a-b*. Further, one or more respective components of the PTR 210 as shown in FIG. 5 may optionally be wholly or at least partially located on a dedicated computing device or server 238, the "option" indicated in FIG. 5 by intermittent line. Such an implementation may free particular computing resources of the PTR 210, such that the PTR 210 may more efficiently perform various other tasks.

There may be a number of ways or methods for enabling a majority of a group of television viewers to control what type of programming is currently being output for presentation by a display device in accordance with the present disclosure. For example, the control may be a function of "direct" user input or a function of "indirect" user input. An example of direct user input is described above at least in connection with FIG. 1. The direct user input scenario may be further understood in connection with FIG. 5.

For example, in practice, a particular individual may enter a social or public environment, such as a sports bar, where there may be one or more televisions that are tuned to particular programming, such as a particular baseball game as depicted in FIG. 2 with respect to televisions 214*a-c*. In this example, the individual may have the computing device 216*a* on their person. The computing device 216*a* may be configured to interact with the PTR 210 to enable the individual to control or have input as to what type of programming is currently being output by the PTR 210 to one or more of the televisions 214*a-c* for presentation thereon. For example, when the individual (and the computing device 216*a*) is within a predetermined distance from the PTR 210, such as within a radius of about less than 20 meters, about less than 30 meters, about less than 40 meters, about less than 50 meters, about less than 100 meters, etc., a communication link may be established between the computing device 216*a* and the PTR 210. For example, the communication module 228 of the PTR 210 may correspond to a Bluetooth® or a WiFi radio that may periodically "ping" for the purpose of discovering computing devices (e.g., computing device 216*a*) configured to interact with the PTR 210 and within the predetermined distance from the PTR 210. Such an implementation may enable the PTR 210 to discover and connect with the computing device 216*a* when for example the computing device 216*a* (and the individual) are at least located within, for example, a parking lot of the sports bar. Certain hardware and/or software resource may be required of a particular computing device to interact with the PTR 210.

For example, the computing device 216a may be configured to include or exhibit a Bluetooth® and/or a WiFi radio such that a communication may be established with the PTR 210 by a particular communication channel. Additionally, the computing device 216a may be configured to include or exhibit a particular mobile application, as stored within the mobile application module 230 for example, that may enable the particular individual to access and/or interact with a listing of television programming "currently" available for viewing, and further select particular programming preferred for viewing in a manner such described above in connection with at least FIGS. 1-3. The access or interaction may be realized by user interaction with the input module 232 of the computing device 216a. For example, the input module 232 may be a touch screen, a microphone, or other type of computer device input mechanism. In the present example, the particular mobile application may or may not be a propriety mobile application made available by the sports bar for download by the computing device 216a from an online mobile application store. The particular mobile application may enable the computing device 216a, when located within the predetermined distance from the PTR 210, to be "matched" to the PTR 210 and/or a customer account associated with the PTR 210 so that the computing device 216a may be used by the particular individual to join a "majority rule" television programming selection process. In the example of FIG. 5, the content management module 220 of the PTR 210 may serve as a control module to manage discovery of the computing device 216a, and control transfer of data between the PTR 210 and the computing device 216a.

As may be understood from the preceding discussion, the PTR 210 including at least the content management module 220 and the communication module 228, and the computing device 216a including at least the mobile application module 230 and the input module 232, may enable a particular individual to participate in selection of television programming for viewing in a public or social environment in manner. This may be referred to as a direct user input scenario. However, control of what type of programming is currently being output for presentation by a display device may also be a function of indirect user input. The indirect user input scenario may be further understood in connection with the social network server 218 in tandem with the PTR 210 and the computing device 216a as shown in FIG. 5.

For example, in a first aspect, the particular individual may use the computing device 216a to interact with a particular social network service. In general, a social network service may refer to an online service, platform, or site that focuses on facilitating the building of social networks or social relations among people who, for example, share interests, activities, backgrounds, or real-life connections. The social network server 218 as shown in FIG. 5 is intended to represent at a high-level one or more computing devices configured to implement feature, functionality, etc., offered by the particular social network service.

In the present example, the particular individual may use the computing device 216a to update their own profile, as housed within the profile module 234 of the social network server 218. In general, the profile may contain a plurality of information such as ideas, activities, events, interests, etc., of and as supplied by at least the particular individual to the profile as part of their interaction with the particular social network service. For example, the individual may be a fanatic Green Bay Packers supporter. In this example, the profile my contain at least one positive reference to the Green Bay Packers, such as a name of a favorite player (e.g., "My Vote For Favorite NFL Player: NAME of the team Green Bay Packers"), and/or any other conceivable bit of information that may in some manner be correlated to the Green Bay Packers football team. Other embodiments are possible.

Continuing with this example, in practice, the particular individual may enter a social or public environment, such as a sports bar, where there may be one or more televisions that are tuned to particular programming, such as a particular baseball game as depicted in FIG. 2 with respect to televisions 214a-c. In this example, the individual may have the computing device 216a on their person. In one aspect, the computing device 216a may be configured to interact with the PTR 210 to enable the individual to have direct control or input as to what type of programming is currently being output by the PTR 210 to one or more of the televisions 214a-c for presentation thereon, such as described above. In another aspect, the computing device 216a may be configured to interact with the PTR 210 to enable the individual to have indirect control or input as to what type of programming is currently being output by the PTR 210 to one or more of the televisions 214a-c for presentation thereon. For example, when the individual (and the computing device 216a) is within a predetermined distance from the PTR 210, such as within a radius of 20-30 meters for example, a communication link may be established between the computing device 216a and the PTR 210. For example, the communication module 228 of the PTR 210 may correspond to a Bluetooth® or a WiFi radio that may periodically or at least intermittently "ping" for the purpose of discovering computing devices (e.g., computing device 216a) configured to interact with the PTR 210 and within the predetermined distance from the PTR 210. As discussed above, certain hardware and/or software resource may be required of the computing device 216a to interact with the PTR 210. More specifically, the computing device 216a and the PTR 210 may have to be compatibly configured in terms communication capability or capabilities.

For example, the computing device 216a may be configured to include or exhibit a Bluetooth® and/or a WiFi radio such that a communication may be established with the PTR 210 by a particular communication channel. Upon establishing a communication link between the computing device 216a and the PTR 210, the content management module 220 of the PTR 210, as pre-authorized by the particular individual, may query the social network server 218 to access at least a portion of the profile, via the API module 236, of the particular individual as contained within the profile module 234. For example, the content management module 220 of the PTR 210 may query the social network server 218 and determine that the individual is likely a fanatic Green Bay Packers supporter, based upon the profile containing at least one reference to the Green Bay Packers as mentioned above. In this example, the content management module 220 may leverage this information to enable the individual to "indirectly" participate in selection of television programming for viewing in a public or social environment.

Figure 6:
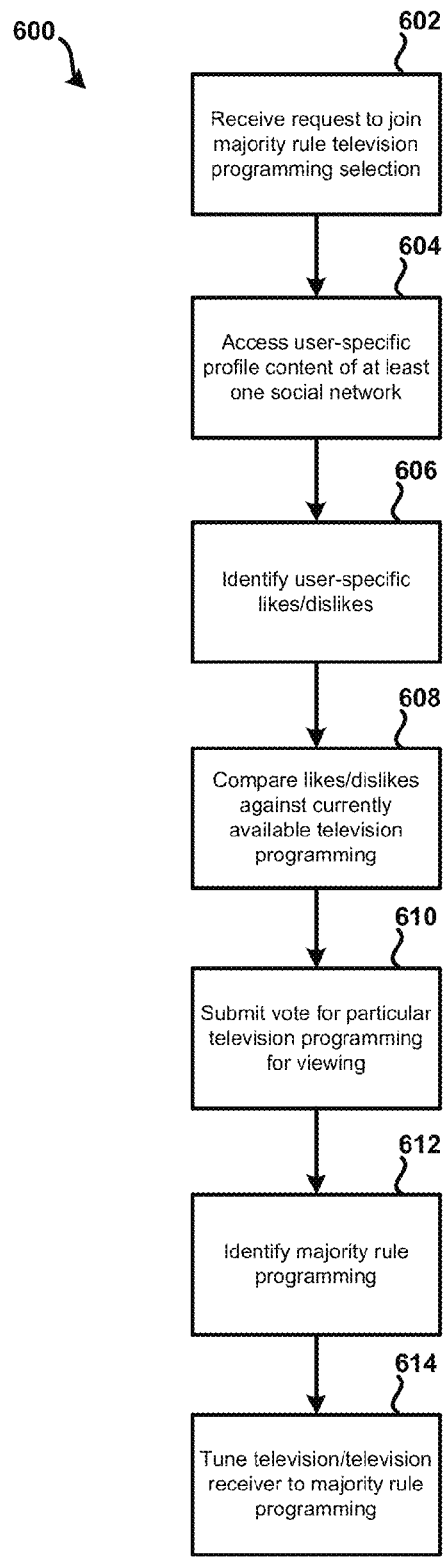
FIG. 6 shows a second example method in accordance with the present disclosure.

For example, referring now to additionally to FIG. 6, a second example method 600 is shown in accordance with the present disclosure. In particular, the method 600 as shown in FIG. 6 and its corresponding description may demonstrate a second example scenario in which a particular individual is enabled to participate in selection of television programming for viewing in a public or social environment. The example method 600 as described may be performed on or by a computing system or device, such as a television receiver. An example of such a computing system or device is discussed below in connection with at least FIG. 7.

The method 600 may include receiving (module 602), by a television receiver from a mobile device, a request to join a "majority rule" television programming selection process. For example, a particular individual may enter a social or public environment, such as a sports bar, where there may be one or more televisions that are tuned to particular programming, such as a particular football game. The individual may have a mobile device, such as a smartphone, on their person. The mobile device may be configured to interact with the television receiver to enable the individual to control or have input as to what type of programming is currently being output by the television receiver to a television for presentation by the television. For example, when the individual (and the mobile device) is within a predetermined distance from the television receiver, such as within a radius of about 20-30 meters for example, the mobile device and the television receiver may establish a communication link, and the television receiver may receive a request from the mobile device to enroll, register, enlist, etc., the mobile device (and the individual) to join the majority rule television programming selection process. This may enable the individual to "indirectly" have input as to what type of programming is currently being output by the television receiver to the television, for presentation by the television.

The method 600 may further include accessing (module 604), by the television receiver, profile content of at least one social network. The profile content being specific to the individual. For example, the television receiver may establish a communication link between the television receiver and at least one social network server to access at least a portion of a user profile, of a social network, specific to the individual. In general, the access may be pre-authorized by the individual and may include authorization to access more than one social network, such as by selection of a particular setting using a mobile application installed to the mobile device that may or may not be a propriety mobile application made available by a corresponding social or public establishment (e.g., sports bar, physician's office, etc.) for download by the mobile device from an online mobile application store. Other embodiments are possible.

The method 600 may further include identifying (module 606), by the television receiver, from the profile content information corresponding to "likes" and/or "dislikes" of the individual. For example, the individual may be a fanatic Green Bay Packers supporter. In this example, the profile may contain, under a "likes" heading or column, the phrase "Green Bay Packers." In another example, the individual may be a detractor of the Denver Broncos. In this example, the profile may contain, under a "dislikes" heading or column, the phrase "Denver Broncos." Other embodiments are possible. For example, the profile may contain at least one positive reference to the Green Bay Packers such as the phrase "My Vote For Favorite NFL Player: NAME of the team Green Bay Packers." In another example, the profile may contain at least one critical or disparaging reference to the Denver Broncos such as the phrase "My Vote For Least Favorite NFL Player: NAME of the team Denver Broncos." Still other embodiments are possible as well. Further, type and form or formatting of information within the user-specific profile may be dependent on the particular social network. For example, a first social network may actually have information itemized according to "likes" and/or "dislikes." In this example, "likes" and/or "dislikes" may be directly observed. In another example, a second social network may not have information itemized according to "likes" and/or "dislikes." In this example, "likes" and/or "dislikes" may be inferred. Still other embodiments are possible.

The method 600 may further include comparing (module 608), by the television receiver, the user-specific likes/dislikes (see module 606) against a list or listing of television programming currently available for viewing. In general, "currently" available television programming may refer to recorded content or live content. In the present example, content of the listing may be similar to that which may be displayed in an EPG. For example, the list may at least present various information related to television channels and the timing of programs or programming appearing on such television channels. For example, the listing may display channel information associated with a channel 2009, where a football game Broncos vs. Ravens may be listed as scheduled to appear on the channel 2009 during a particular time period 1-4:30 PM of a particular day Jan. 16, 2013. The list may further display channel information associated with a channel 2012, where a football game Packers vs. 49ers may be listed as scheduled to appear on the channel 2012 during the particular time period 1-4:30 PM of the particular day Jan. 16, 2013. Other embodiments are possible.

The method 600 may further include submitting (module 610), by the television receiver, or "casting" a vote on behalf of the individual that represents input associated with selection of particular programming preferred for viewing by the particular individual. For example, the television receiver may "select" the Packers vs. 49ers game as a preferred programming for viewing on behalf of the individual based on at least two factors. A first factor may relate to the football game Packers vs. 49ers being "currently" available for viewing. A second factor may relate to the television receiver identifying at least one positive reference to the Green Bay Packers within a social network profile associated with the individual, in a manner as discussed above. Other embodiments are possible.

The method 600 may further include identifying (module 612), by the television receiver, particular programming of currently available programming that is "majority rule programming." Majority rule programming may refer to programming having a "greatest" number of individuals in favor of watching the same. For example, upon submission of the vote on behalf of the individual that represents input associated with selection of particular programming preferred for viewing by the particular individual (see module 610), the television receiver may "tally the vote" and determine, based on an updated tally, which programming of currently available programming has the "greatest" number of individuals in favor of watching the same. For example, and assuming for simplicity that the only currently available programming is the Broncos vs. Ravens game and the Packers vs. 49ers game, the television receiver may determine that five (5) individuals are in favor of watching the Broncos vs. Ravens game, and that six (6) individuals are in favor of watching the Packers vs. 49ers game. In this example, the vote submitted by the television receiver on behalf of the particular individual in favor of watching the Packers vs. 49ers game tipped the scales such the Packers vs. 49ers game has the majority vote, and may be considered the majority rule programming. In accordance with the present disclosure, and continuing with the example scenario, the television receiver may take into account this new majority rule programming and change tuning from the Broncos vs. Ravens game such that the Packers vs. 49ers game corresponds to programming currently being output by the television receiver to the television for presentation by the television.

For example, the method 600 may further include tuning (module 614), by the television receiver, the television receiver from a channel associated with first programming to a channel associated with majority rule programming. For example, the television receiver may change tuning from the Broncos vs. Ravens game to the Packers vs. 49ers game such that the Packers vs. 49ers game corresponds to programming currently being output by the television receiver to the television for presentation by the television. Other embodiments are possible.

Figure 7:
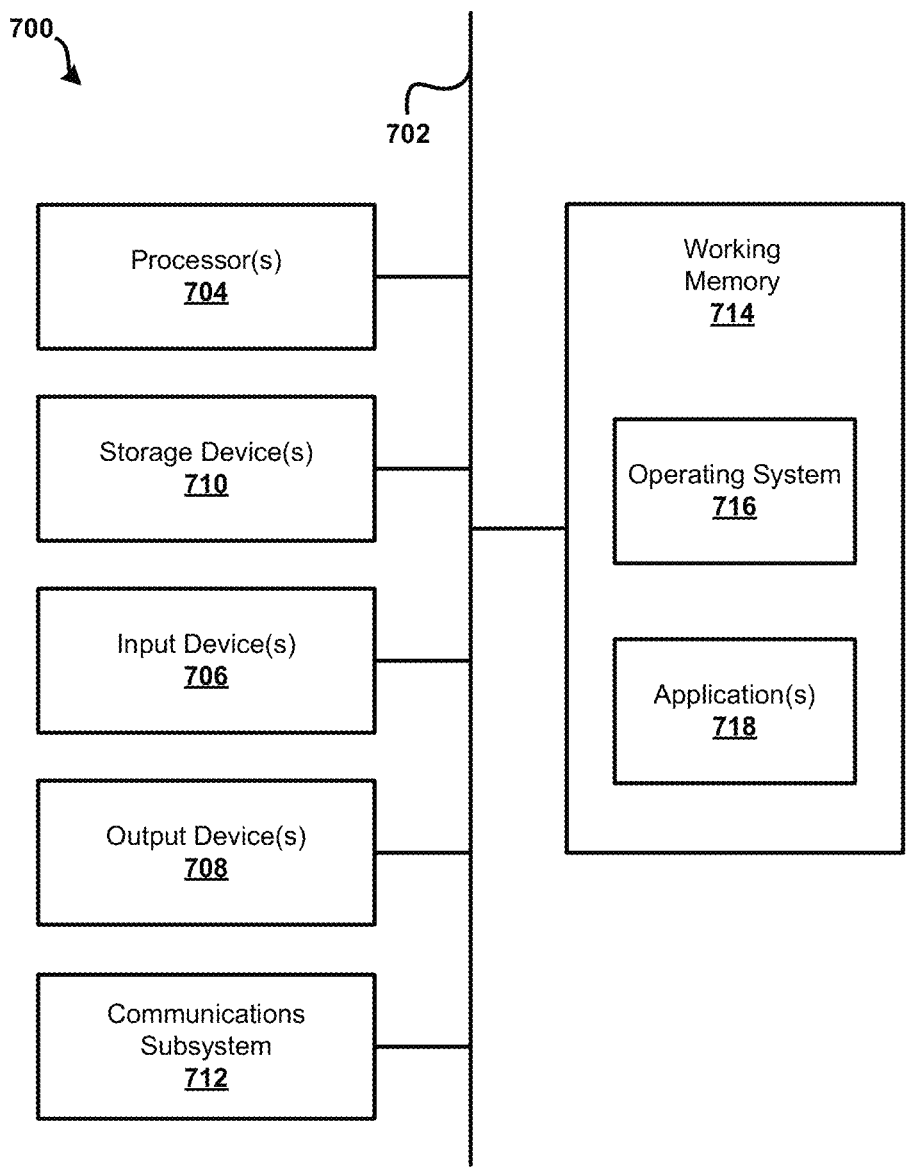
FIG. 7 shows an example computing system or device.

FIG. 7 shows an embodiment of an example computer system or device 700. An example of a computer system or device includes an enterprise server, blade server, desktop computer, laptop computer, personal data assistant, smartphone, gaming console, STB, and any other type machine for performing calculations. The computer system 700 may be wholly or at least partially incorporated as part of previously-described computing devices, such as the PTR 210, the STRs 212a-b, the televisions 214a-c, the computing devices 216a-b, and the social network server(s) 218 of FIG. 2. The example computer device 700 may be configured to perform and/or include instructions that, when executed, cause the computer system 700 to perform the method of FIG. 1 and FIG. 6. The example computer device 700 may be configured to perform and/or include instructions that, when executed, cause the computer system 700 to instantiate and implement functionality of the content management module 220 as described above.

The computer device 700 is shown comprising hardware elements that may be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which can include without limitation a remote control, a mouse, a keyboard, and/or the like; and one or more output devices 708, which can include without limitation a presentation device (e.g., television), a printer, and/or the like.

The computer system 700 may further include (and/or be in communication with) one or more non-transitory storage devices 710, which can comprise, without limitation, local and/or network accessible storage, and/or can include, without limitation, a disk drive, a drive array, an optical storage device, a solid-state storage device, such as a random access memory, and/or a read-only memory, which can be programmable, flash-updateable, and/or the like. Such storage devices may be configured to implement any appropriate data stores, including without limitation, various file systems, database structures, and/or the like.

The computer device 700 might also include a communications subsystem 712, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which may include a random access memory and/or a read-only memory device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. By way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the invention. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, may refer to any medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 710. Volatile media may include, without limitation, dynamic memory, such as the working memory 714.

Example forms of physical and/or tangible computer-readable media may include a floppy disk, a flexible disk, hard disk, magnetic tape, or any other magnetic medium, a CD-ROM, any other optical medium, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for enabling a mobile device having a mobile application associated with a television receiver to participate in selection of television programming for presentation by a display device external the mobile device, comprising:
    scanning, by the television receiver, a predetermined distance from the television receiver at periodic intervals for mobile devices for which an indication of selection of particular television programming for presentation by the display device has not been received;
    automatically establishing, by the television receiver, a communication link from the television receiver to a mobile device identified by the scanning;
    sending, by the television receiver, to the mobile device a listing of a plurality of instances of television programming including programming currently being displayed by the display device and additional television programming currently available though not presently being displayed;
    receiving, at the television receiver from the mobile device, an indication of selection of particular television programming for presentation by the display device;
    determining, by the television receiver based on the indication of selection, whether a collective indication of selection tally of the particular television programming is greater than a collective indication of selection tally of other television programming; and
    outputting by the television receiver the particular television programming for presentation by the display device when the particular television programming has a collective indication of selection tally greater than a collective indication of selection tally of other television programming,
    wherein the mobile application comprises a proprietary mobile application made available by an owner of the television receiver.

2. The method of claim 1, further comprising receiving from a social networking computing system an indication of selection of first television programming other than the particular television programming for presentation by the display device.

3. The method of claim 2, further comprising determining, based on the indication of selection of the first television programming, whether a collective indication of selection tally of the first television programming is greater than a collective indication of selection tally of other television programming.

4. The method of claim 3, further comprising outputting the first television programming for presentation by the display device when the first television programming has a collective indication of selection tally greater than a collective indication of selection tally of other television programming.

5. The method of claim 1, further comprising the indication of selection of particular television programming based on user selection of an icon associated with the particular television programming within the listing sent to the mobile device.

6. The method of claim 1, further comprising: determining that the collective indication of selection tally of the particular television programming is greater than the collective indication of selection tally of other television programming; and receiving a command based on user input to output the particular television programming for presentation by the display device.

7. The method of claim 1, further comprising outputting the particular television programming for presentation by the display device without user input in response to determining that the collective indication of selection tally of the particular television programming is greater than the collective indication of selection tally of other television programming.

8. The method of claim 1, further comprising registering a mobile device to participate in selection of television programming for presentation by a display device external the mobile device.

9. The method of claim 1, further comprising establishing a communication link with the mobile device when the mobile device is within at least about 100 meters from one of the television receiver and the display device.

10. The computer-implemented method of claim 1, wherein the scanning comprises locating mobile devices having a mobile application associated with the television receiver, wherein the mobile application allows the listing to be received by the mobile device.

11. A television receiver, comprising:
one or more processors; and
a memory communicatively coupled with and readable by the one or more processors and having stored therein processor-readable instructions which, when executed by the one or more processors, cause the one or more processors to:
scan a predetermined distance from the television receiver at periodic intervals for mobile devices each having a mobile application associated with the television receiver for which an indication of selection of particular television programming for presentation by a display device coupled with the television receiver has not been received;
automatically establish a communication link from the television receiver to a mobile device identified by the scanning;
send to the mobile device a listing of a plurality of instances of television programming including programming currently being displayed by the display device and additional television programming currently available though not presently being displayed;
receive an indication from the mobile device of selection of particular television programming for presentation by the display device;
determine, based on the indication of selection, whether a collective indication of selection tally of the particular television programming is greater than a collective indication of selection tally of other television programming; and
output the particular television programming for presentation by the display device when the particular television programming has a collective indication of selection tally greater than a collective indication of selection tally of other television programming,
wherein the mobile application comprises a proprietary mobile application made available by an owner of the television receiver.

12. The system of claim 11, wherein the memory having stored therein processor-readable instructions which, when executed by the one or more processors, cause the one or more processors to identify receipt of an indication from a social networking computing system of selection of first television programming other than the particular television programming for presentation by the display device.

13. The system of claim 12, wherein the memory having stored therein processor-readable instructions which, when executed by the one or more processors, cause the one or more processors to determine, based on the indication of selection of the first television programming, whether a collective indication of selection tally of the first television programming is greater than a collective indication of selection tally of other television programming.

14. The system of claim 13, wherein the memory having stored therein processor-readable instructions which, when executed by the one or more processors, cause the one or more processors to output the first television programming for presentation by the display device when the first television programming has a collective indication of selection tally greater than a collective indication of selection tally of other television programming.

15. The system of claim 11, wherein the memory having stored therein processor-readable instructions which, when executed by the one or more processors, cause the one or more processors to periodically search to discover other mobile devices to participate in selection of television programming for presentation by the di splay device.

16. A non-transitory processor-readable medium within a television receiver comprising processor-readable instructions configured to cause one or more processors to:
scan a predetermined distance from the television receiver at periodic intervals for mobile devices each having a mobile application associated with the television receiver for which an indication of selection of particular television programming for presentation by a display device has not been received;
automatically establish a communication link from the television receiver to a mobile device identified by the scanning;
identify an available social media profile for a user of the mobile device from at least one of a plurality of external social media sites;
access and scan the social media profile at the at least one of the plurality of external social media sites via a wide area network for information related to current broadcast programming;

identify data on the social media profile related to at least one particular television program of the current broadcast programming;

generate an indication of selection of particular television programming of the current broadcast programming for presentation by the display device for the mobile device without input received directly from the mobile device, wherein the indication of selection of particular television programming is based at least in part on the data on the social media profile related to at least one particular television program of the current broadcast programming;

determine, based on the indication of selection, whether a collective indication of selection tally of the particular television programming is greater than a collective indication of selection tally of other television programming; and output the particular television programming for presentation by the display device when the particular television programming has a collective indication of selection tally greater than a collective indication of selection tally of other television programming, wherein the mobile application comprises a proprietary mobile application made available by an owner of the television receiver.

17. The non-transitory processor-readable medium within a television receiver of claim 16, wherein the processor is further caused to determine a positive association between identified data on the social media profile and a particular television program of the current broadcast programming, and wherein the processor is further caused to generate an indication of selection for that particular television program of the current broadcast programming.

18. The non-transitory processor-readable medium within a television receiver of claim 16, wherein the processor is further caused to determine a negative association between identified data on the social media profile and a particular television program of the current broadcast programming, and wherein the processor is further caused to generate an indication of selection for at least one different particular television program of the current broadcast programming.

* * * * *